(12) United States Patent
Liao et al.

(10) Patent No.: US 8,862,975 B2
(45) Date of Patent: Oct. 14, 2014

(54) WEB-BASED WORKFLOW SERVICE VISUALIZATION AND NAVIGATION

(75) Inventors: Min Liao, Shanghai (CN); Minmin Xue, Shanghai (CN); Zaiyue Xue, Shanghai (CN); Xiaofeng Fan, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 13/235,593

(22) Filed: Sep. 19, 2011

(65) Prior Publication Data

US 2013/0073994 A1    Mar. 21, 2013

(51) Int. Cl.
| | | |
|---|---|---|
| G06F 17/00 | (2006.01) | |
| G06F 3/048 | (2013.01) | |
| G06F 9/44 | (2006.01) | |
| G06F 7/00 | (2006.01) | |
| G06Q 10/06 | (2012.01) | |

(52) U.S. Cl.
CPC *G06F 3/048* (2013.01); *G06F 9/44* (2013.01); *G06F 7/00* (2013.01); *G06Q 10/06* (2013.01)
USPC ............................................................ 715/200

(58) Field of Classification Search
USPC ............................................................ 715/200
See application file for complete search history.

(56) References Cited

U.S. PATENT DOCUMENTS

| | | | | |
|---|---|---|---|---|
| 6,360,236 | B1 * | 3/2002 | Khan et al. ............... | 715/207 |
| 7,342,589 | B2 * | 3/2008 | Miserocchi ............... | 345/536 |
| 7,363,628 | B2 | 4/2008 | Shukla et al. | |
| 7,571,392 | B2 * | 8/2009 | Cortesi .................... | 715/765 |
| 7,665,093 | B2 | 2/2010 | Maybee et al. | |
| 7,681,192 | B2 * | 3/2010 | Dietsch et al. ........... | 717/172 |
| 7,761,393 | B2 | 7/2010 | Macbeth et al. | |
| 7,844,910 | B2 * | 11/2010 | Shiraishi et al. .......... | 715/763 |
| 8,117,280 | B2 * | 2/2012 | Masuouka et al. ........ | 709/218 |
| 8,249,100 | B2 * | 8/2012 | Hersche et al. ........... | 370/466 |
| 8,442,937 | B2 * | 5/2013 | Gabriel et al. ............ | 707/608 |
| 8,478,616 | B2 * | 7/2013 | De Klerk et al. .......... | 705/7.11 |
| 8,635,080 | B2 * | 1/2014 | McKeown et al. ........ | 705/1.1 |
| 8,635,624 | B2 * | 1/2014 | Subramanya et al. ..... | 718/104 |
| 8,648,862 | B2 * | 2/2014 | Schildermans et al. ... | 345/471 |
| 2003/0074247 | A1 * | 4/2003 | Dick et al. ............... | 705/9 |

(Continued)

OTHER PUBLICATIONS

Youxin et al., Design of Workflow Engine based on WCF, IEEE 2009, pp. 100-103.*

(Continued)

*Primary Examiner* — Cong-Lac Huynh
(74) *Attorney, Agent, or Firm* — Kevin Sullivan; Kate Drakos; Micky Minhas

(57) ABSTRACT

Web workflow service information may include implementations, contracts, addresses, bindings, and other information that is sprinkled throughout source files, configuration files, and other locations. A service explorer extracts service information, and visualizes service information in a form that supports navigation, thereby helping developers understand and use workflow service information. A workflow service structure underlying the visualization is constructed with the extracted service information. A hierarchical node visualization of the service structure is displayed in a service explorer GUI. A developer navigates by expanding/contracting nodes, searching nodes, selecting nodes, and running tools with node-specific information, e.g., for testing, tracing, publication, workflow design, and so on. The visualization is automatically updated after service configuration changes. Node-specific source code is displayed for contract and implementation classes, and pertinent sections of configuration files are displayed for bindings and addresses. Derivation of endpoints, bindings, and addresses are displayed for implicitly set endpoints.

20 Claims, 3 Drawing Sheets

(56) References Cited

U.S. PATENT DOCUMENTS

| | | | |
|---|---|---|---|
| 2003/0078975 A1* | 4/2003 | Ouchi | 709/205 |
| 2004/0064353 A1* | 4/2004 | Kim et al. | 705/8 |
| 2005/0049961 A1* | 3/2005 | Hansen | 705/38 |
| 2006/0233345 A1* | 10/2006 | Frediani et al. | 379/265.02 |
| 2007/0038494 A1* | 2/2007 | Kreitzberg et al. | 705/8 |
| 2007/0156486 A1* | 7/2007 | Sanabria et al. | 705/8 |
| 2007/0214178 A1* | 9/2007 | Sheffler et al. | 707/104.1 |
| 2008/0040180 A1* | 2/2008 | Aleong et al. | 705/8 |
| 2008/0126168 A1* | 5/2008 | Carney et al. | 705/8 |
| 2008/0127189 A1* | 5/2008 | Braun et al. | 718/102 |
| 2008/0262875 A1* | 10/2008 | Plavnik et al. | 705/3 |
| 2009/0049422 A1* | 2/2009 | Hage et al. | 717/104 |
| 2009/0089078 A1* | 4/2009 | Bursey | 705/1 |
| 2009/0119672 A1* | 5/2009 | Bussard et al. | 718/104 |
| 2009/0260021 A1 | 10/2009 | Haenel et al. | |
| 2009/0307570 A1* | 12/2009 | Hirata | 715/200 |
| 2010/0241471 A1* | 9/2010 | Nylander et al. | 705/7 |
| 2010/0250497 A1* | 9/2010 | Redlich et al. | 707/661 |
| 2011/0197061 A1* | 8/2011 | Chou et al. | 713/156 |
| 2011/0264588 A1* | 10/2011 | Jensen et al. | 705/80 |
| 2011/0270872 A1* | 11/2011 | Alvarez et al. | 707/769 |
| 2012/0143938 A1* | 6/2012 | du Preez et al. | 709/201 |
| 2012/0150752 A1* | 6/2012 | Karasek | 705/301 |
| 2012/0331444 A1* | 12/2012 | Szpak et al. | 717/105 |
| 2013/0080883 A1* | 3/2013 | Narasani | 715/255 |
| 2013/0086062 A1* | 4/2013 | Coyne | 707/736 |
| 2013/0091170 A1* | 4/2013 | Zhang et al. | 707/783 |
| 2013/0132273 A1* | 5/2013 | Stiege et al. | 705/41 |
| 2013/0144678 A1* | 6/2013 | Ramachandran | 705/7.26 |
| 2013/0184844 A1* | 7/2013 | Dinicola et al. | 700/95 |
| 2013/0218629 A1* | 8/2013 | Brower et al. | 705/7.23 |
| 2013/0304861 A1* | 11/2013 | Gupta et al. | 709/217 |

OTHER PUBLICATIONS

Kambhampaty et al., Architecting for Next Generation Business Applications, Google 2006, pp. 584-589.*

Benatallah et al., Overview of Some Patterns for Architecting and Managing Composite Web Services, ACM 2002, pp. 9-16.*

Chen et al., A Workflow-based Cooperative Project Management System, IEEE 2011, pp. 69-73.*

Callahan et al., Software Project Management and Measurement on the World-Wide-Web (WWW), IEEE 1996, pp. 156-161.*

Lin, et al., "A Reference Architecture for Scientific Workflow Management Systems and the VIEW SOA Solution", Retrieved at <<http://ieeexplore.ieee.org/stamp/stamp.jsp?tp=&arnumber=4782949>>, IEEE transactions on services computing, vol. 2, No. 1, Feb. 13, 2009, pp. 79-92.

Glatard, et al., "A Service-Oriented Architecture enabling dynamic service grouping for optimizing distributed workflow execution", Retrieved at <<http://www.i3s.unice.fr/~johan/publis/FGCS07.pdf>>, Future Generation Computer Systems, vol. 24, Issue 7, Oct. 18, 2007, pp. 1-27.

Maurer, et al., "Merging Project Planning and Web-Enabled Dynamic Workflow Technologies", Retrieved at <<http://ieeexplore.ieee.org/stamp/stamp.jsp?tp=&arnumber=845392>>, IEEE Internet Computing,vol. 4 Issue:3, May-Jun. 2006, pp. 65-74.

Sun, Tong, "An Intelligent Wizard for Automatic Workflow Modeling", Retrieved at <<http://ieeexplore.ieee.org/stamp/stamp.jsp?tp=arnumber=4274295>>, IEEE International Conference on Systems, Man, and Cybernetics, Oct. 8-11, 2006, pp. 2742-2746.

Blake, Brian, M., "Coordinating multiple agents for workflow-oriented process orchestration", Retrieved at <<http://www.cse.nd.edu/~mblake3/pubs/blake__ISEB2003.pdf>>, Information Systems and E-Business Management, vol. 1, No. 4, 2003, pp. 1-18.

"Service-oriented architecture", Retrieved at <<http://en.wikipedia.org/wiki/Service-oriented_architecture>>, Jul. 4, 2011, pp. 18.

"SO-AWARE™ | Tellago Studios", Retrieved at <<http://tellagostudios.com/products/so-aware™>>, copyright 2011, pp. 6.

"System.ServiceModel Namespace", Retrieved at <<http://msdn.microsoft.com/en-us/library/ms195526.aspx>>, copyright 2011, pp. 14.

"System.ServiceModel Namespaces", Retrieved at <<http://msdn.microsoft.com/en-us/library/gg145010.aspx>>, copyright 2011, pp. 4.

"Agile SOA Governance: SO-Aware and Visual Studio Integration | Tellago Studios", Retrieved at <<http://www.tellagostudios.com/agile-soa-governance-so-aware-and-visual-studio-integration>>, Mar. 9, 2011, pp. 6.

"Web service", Retrieved at <<http://en.wikipedia.org/wiki/Web_service>>, Jul. 17, 2011, pp. 5.

"Windows Communication Foundation", Retrieved at <<http://en.wikipedia.org/wiki/Windows_Communication_Foundation>>, Jun. 22, 2011, pp. 3.

* cited by examiner

WEB-BASED WORKFLOW SERVICE VISUALIZATION AND NAVIGATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In a very broad sense, a "workflow" is something which includes steps and resources for accomplishing specified work. The specified work performed by a workflow may include transforming physical items, providing services, and/or processing data, for example. A workflow may include a sequence of reliably repeatable operations to be performed by a person, by a group of people, and/or by various mechanisms, for example. Interactions between people, computers, and/or other machines may be part of a workflow. Documents, products, compositions, data and other things which are created, modified, or otherwise used in the workflow operations may be described as part of a workflow's description. Workflow is sometimes characterized as an abstraction or virtual representation of actual work.

SUMMARY

A workflow service in a web application often depends on a variety of implementations, contracts, addresses, bindings, and other information which is embedded in various source files, configuration files, and other locations, making it difficult for a developer to gain sufficient understanding of service entities, their relationships, and their contributions to workflow functionality. However, some embodiments described herein facilitate developer understanding and use of web application workflow service information.

Some embodiments transform web application workflow information to facilitate developer understanding and use of that information. After obtaining web application project files, some embodiments extract workflow service information from the files and construct a workflow service structure based on the extracted information. A visualization of the workflow service structure can then be displayed in a graphical user interface. Developers can navigate within a workflow service using the visualization. For example, using the graphical user interface a developer can make a navigational gesture which selects a node of the workflow service structure. In response to a node selection, some embodiments open web application project file(s) that show service information used in constructing the node in the workflow service structure.

The project files may include workflow implementation source files and configuration files, for example. Extracted information may include service class name, service contract name, service operation contract name, service endpoint address, service endpoint binding type, and/or service implementation class name, for example.

With some embodiments, the web application project files may be organized in one or more projects of an Integrated Development Environment (IDE). For instance, the project files could match one of the following usage patterns: (a) service contract, implementation, hosting and configuration files all reside within a single project; (b) a service contract resides in a first project, whereas service implementation, hosting, and configuration files reside in one or more other projects; (c) a service contract resides in a first project, a service implementation file resides in a second project, and hosting and configuration files reside in a third project.

In some embodiments, the workflow service structure is constructed by calculating a code-based candidate service tree from a code model, calculating a config-based candidate service tree from a configuration file, and merging the code-based candidate service tree and the config-based candidate service tree. In some, the workflow service structure includes workflow service information for a service contract for a service that is defined implicitly using Receive activities, and/or a service contract for a web API service in which binding information is optional.

In some embodiments, a displayed visualization of the workflow service structure shows a hierarchy of nodes. The nodes may be arranged in various ways. In some cases, a service endpoint binding node is subordinate to a service class node. In some, a service endpoint address node is subordinate to a service endpoint binding node. In some cases, after a user selects a service contract node within a first area of the graphical user interface, operation contract node(s) associated with the selected service contract node are shown in a second area of the graphical user interface which is visually separated from the first area by demarcation lines, window edges, and/or background color differences. In some displays, a service contracts root node and a service endpoints root node are at the same level in the hierarchy. Other nodes, and other node arrangements, are also present in some embodiments.

From a developer's perspective, some embodiments involve the developer running a service explorer tool in an IDE, and viewing a hierarchical workflow service structure visualization in the service explorer GUI (graphical user interface). Using the GUI and the visualization, the developer then performs some action. For instance, after making a change in a configuration file, the developer may act simply by viewing an automatically updated visualization which reflects the change. Often, however, the actions occur with a node selection by the developer. Visualization nodes may be selected directly, e.g., by clicking on them in the GUI, or indirectly, e.g., by searching. For instance, in some embodiments the developer selects a node at least in part by searching for service information such as a service name, a service contract name, and/or an operation name.

After selecting a node of the visualization through the GUI, in some cases the developer views an automatically opened web application project file which contains service information for the selected node, and/or the developer views and uses a web application project tool which has automatically received service information for the selected node. In some cases, the developer selects a node and then edits configuration settings through a service configuration editor which is run for the selected node. Web application project tools viewed and used by the developer in response to node selection vary by embodiment, including for example a tracing tool, a configuration tool, a client testing tool, a unit testing tool, a hosting option tool, and/or a publishing tool, as well as the service explorer tool.

In some cases, the developer selects a node of the visualization through a view-contract item of the GUI, and then views an automatically opened web application project file which contains contract class source code service information for the selected node. In some, the developer selects a node through a view-implementation item of the GUI and views an automatically opened file of implementation class source code service information for the selected node. In some cases, the developer selects a node of the visualization through a view-configuration GUI item, and views an automatically opened file that contains configuration service information for the selected node.

In some embodiments, an endpoint node representing an endpoint is selected, and the endpoint was set implicitly at a prior time. The developer then views automatically displayed service information which clarifies a derivation of the endpoint. Similarly, in some cases an address node representing an address is selected, an endpoint associated with the address was set implicitly, and the developer views automatically displayed service information which clarifies a derivation of the address. Likewise, in some cases a binding node representing a binding is selected, an endpoint associated with the binding was set implicitly, and the developer views automatically displayed service information which clarifies a derivation of the binding.

Within the GUI visualization of the hierarchy, some nodes may be expandable to reveal any subordinate nodes, and likewise a developer may unexpand a node, in some cases, to hide the node's subordinates from view in the GUI. Nodes may be expanded be default—that is, expanded when first displayed—or not, in some embodiments. Specifically, in some cases the developer views a visualization of a workflow service structure in which at least two of the following are expanded by default: a project node; a service node; an endpoint node that has at least one of the following subordinate nodes: address, binding, service contract.

In some embodiments, the visualization seen by the developer has nodes representing at least one of the following service types: a Windows® Communication Foundation (WCF) Core Service, a WCF Workflow Service, a WCF Web API Service, a WCF RIA Service, a WCF Data Service, a WCF Workflow Component Service (mark of Microsoft Corporation).

From an architectural perspective, some embodiments include a logical processor and a memory in operable communication with the logical processor. A hierarchical workflow service structure residing in the memory has at least the following nodes: a service node, an endpoint node, an endpoint address node, an endpoint binding node, an endpoint service contract node. A service explorer (also in the memory) includes instructions which upon execution by a processor will result in a display to a user. In some cases, the display includes an automatically updated visualization of the hierarchical workflow service structure reflecting a change to a configuration file that is associated with a node of the structure. In some, the display includes an automatically opened file which contains textual information (e.g., source code, configuration values) for a user-selected node of the hierarchical workflow service structure. In some cases, the display shows a tool (other than the service explorer) which has automatically received information for a user-selected node of the hierarchical workflow service structure. Various tools for service exploration, tracing, configuration, client testing, unit testing, hosting option, publishing, and so on, may be part of an embodiment. In some cases, such tools may be run by a user directly from within the service explorer.

In some embodiments, the service explorer also has instructions which will extract workflow service information from web application project files and construct the hierarchical workflow service structure based at least in part on the extracted workflow service information.

Some embodiments include a display configured by a visualization of the hierarchical workflow service structure. In some visualizations, conditions such as the following occur: an operation contract node associated with a selected service contract node is shown in an area of the graphical user interface which is visually separated by a line from the selected service contract node; a service contracts root node and a service endpoints root node are at the same level in the hierarchy; a service contract node which has at least one subordinate operation contract node is unexpanded by default.

In some embodiments, the service explorer includes instructions which will perform additional activities. In some, the service explorer accepts a visualization node selection through a view-contract item of the graphical user interface and then automatically displays a file which contains contract class source code service information for the selected node. In some, the service explorer accepts a visualization node selection through a view-implementation item of the graphical user interface and then automatically displays a file which contains implementation class source code service information for the selected node. In some, the service explorer accepts a visualization node selection through a view-configuration item of the graphical user interface and then automatically displays a file which contains configuration service information for the selected node.

In some embodiments, the service explorer includes instructions that will accept selection of an endpoint node which represents an implicitly set endpoint, and then automatically display service information which clarifies a derivation of the endpoint. In some, the service explorer instructions will accept selection of an endpoint node which represents an explicitly set endpoint, and then automatically display an endpoint section of a configuration file for the endpoint. In some, the service explorer instructions will accept selection of an address node which represents an address that has an associated implicitly set endpoint, and then automatically display service information which clarifies a derivation of the address. In some, the service explorer instructions will accept selection of an address node which represents an address that has an associated explicitly set endpoint, and then automatically display an address section of a configuration file for the endpoint. In some, the service explorer instructions will accept selection of a binding node which represents a binding that has an associated implicitly set endpoint, and then automatically display service information which clarifies a derivation of the binding. In some, the service explorer instructions will accept selection of a binding node which represents a binding that has an associated explicitly set endpoint, and then automatically display a binding section of a configuration file for the endpoint.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
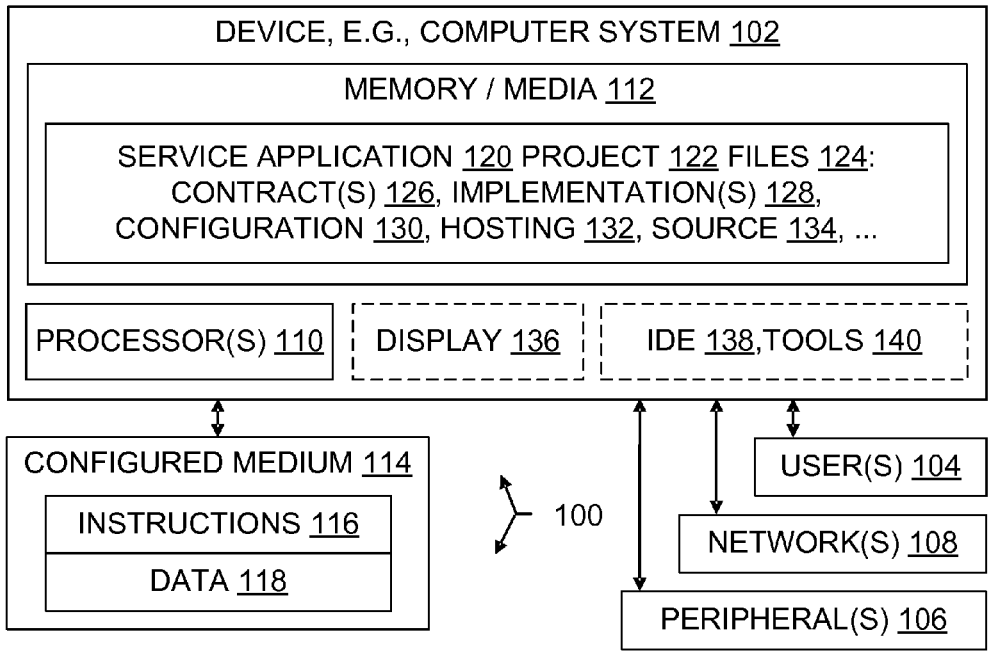
FIG. 1 is a block diagram illustrating a computer system having at least one processor (perhaps having multiple processors in multiple machines), also having at least one memory in operable communication with the processor(s), at least one service application, and other items, in an operating environment which may be present on multiple network nodes, and also illustrating configured storage medium embodiments.

In many cases, a workflow application is not self-contained. Many web-based application workflows use a service, such as a SOAP (Simple Object Access Protocol) or REST (Representational State Transfer) service, to allow clients (service consumers) to communicate with the service. Such a service often involves many entities, for service definition, service implementation, service addressing, service communication protocols, and so on. During development time, these entities are often spread throughout a developer's project, located in multiple files and/or at different positions in a large file.

Without suitable help, a developer will switch many times between different files, and scroll through workflow file editors and configuration editors to view these properties and other entities, while trying to analyze the service structure. It can be very challenging for a developer to get a comprehensive and coherent sense of how a workflow is exposing itself as a service. It can also be difficult for a developer to navigate among different service artifacts. The larger the project, the more challenging service development becomes.

Some embodiments described herein provide tools and techniques to generate a service view (a visualization) for a workflow project, so developers can more readily gain a general idea of how the workflow is exposing itself as a service. Some embodiments facilitate navigation among different service aspects within the service view. Accordingly, some embodiments analyze all workflow implementation source files and configuration files in a project, find the parts that are service related, sort them according to which service they belong in, group them together to build a service structure, and visualize the service structure in a graphical user interface. Some embodiments record the file positions (offsets in a file), as well as file locations, when analyzing the files, and make use of that positional information to aid developer navigation among service entities.

Some embodiments described herein may be viewed in a broader context. For instance, concepts such as workflow, services, contracts, implementations, addresses, and visualization may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving workflow, services, contracts, implementations, addresses, and/or visualization are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Computationally" means a computing device (processor plus memory, at least) is being used, and excludes obtaining a computational result by mere human thought or mere human action alone. For example, doing arithmetic with a paper and pencil is not doing arithmetic computationally as understood herein.

Throughout this document, use of the optional plural "(s)", "(es)", or "(ies)" means that one or more of the indicated feature is present. For example, "file(s)" means "one or more files" or equivalently "at least one file".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, associating, binding, calculating, changing, configuring, constructing, defining, deriving, displaying, editing, expanding, extracting, having, hosting, including, launching, merging, obtaining, opening, performing, publishing, receiving, representing, residing, running, searching, selecting, separating, setting, showing, testing, tracing, transforming, unexpanding, viewing, visualizing, (or accepts, accepted, associates, associated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, and/or optical media, as opposed to media such as a wire that merely propagates a signal. In particular, a configured storage medium 114 such as a CD, DVD, memory stick, or other removable non-volatile memory medium may become functionally part of the computer system when inserted or otherwise installed, making its content accessible for use by processor 110. The removable configured storage medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by binding, construction, deployment, execution, extraction, modification, display, creation, loading, and/or other operations.

A web-based service application 120 which is organized in one or more projects 122 and files 124 (e.g., files defining contracts 126, implementations 128, configuration(s) 130, hosting 132), including source code files (source 134), as well as other data and software, and other items shown in the Figures and/or discussed in the text, may reside partially or entirely within one or more media 112, thereby configuring those media. In addition to processor(s) 110 and memory 112, an operating environment may also include other hardware, such as display(s) 136, buses, power supplies, and accelerators, for instance.

A given operating environment 100 may include an Integrated Development Environment (IDE) 138 and/or other software development tools 140. An IDE 138 provides a developer with a set of coordinated software development tools, such as editor(s), compiler(s), and debugger(s). In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use web-based application environments, workflow service technologies, or both.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
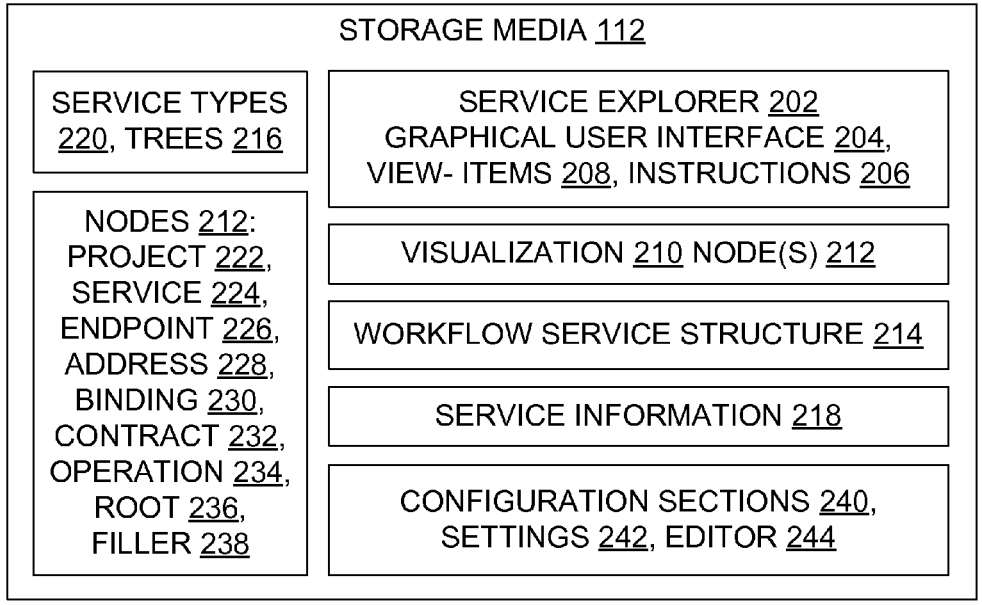
FIG. 2 is block diagram illustrating aspects of an example architecture for web-based workflow service visualization and navigation.

FIG. 2 illustrates an architecture which is suitable for use with some embodiments. A service explorer 202 includes a graphical user interface 204 and instructions 116, 206. Within the GUI 204, in addition to windows, scroll bars, and similar controls, some embodiments include tool-tips, context-sensitive menus, and/or other mechanisms, which are used to implement view-items 208 such as a view-contract, view-implementation, and view-configuration GUI items 208. The GUI supports display and navigation of a visualization 210 (e.g., a hierarchy of nodes 212) which represents a workflow service structure 214. The workflow service structure 214 includes tree(s) 216, graph(s), and/or other linked data structure(s) containing and organizing service information 218.

In some embodiments, service information 218 includes information extracted from files 124. In some, service types 220 such as different Windows® Communication Foundation (WCF) service types are specified in service information 218 (mark of Microsoft Corporation). The visualization 210 and the service structure 214 have corresponding nodes 212, but a service structure node is not necessarily displayed in a visualization at a given point in time. Nodes 212 may be tailored to display and/or to provide access to particular kinds of service information 218, including for example project nodes 222, service nodes 224, endpoint nodes 226, address nodes 228, binding nodes 230, contract nodes 232, and operation nodes 234. A given node 212 may belong to more than one category, e.g., an operation contract node 232, 234 is both a contract node 232 and an operation node 234. Organizational nodes 212 for organizing a visualization may also be present, such as root nodes 236 and filler nodes 238.

Within configuration files 130 and other sources of service information, particular syntactically delimited sections 240 may pertain to particular kinds of service information, e.g., to addresses or to bindings, for example. Configuration files may contain settings 242, which can be edited in familiar manner using an editor 244.

Figure 3:
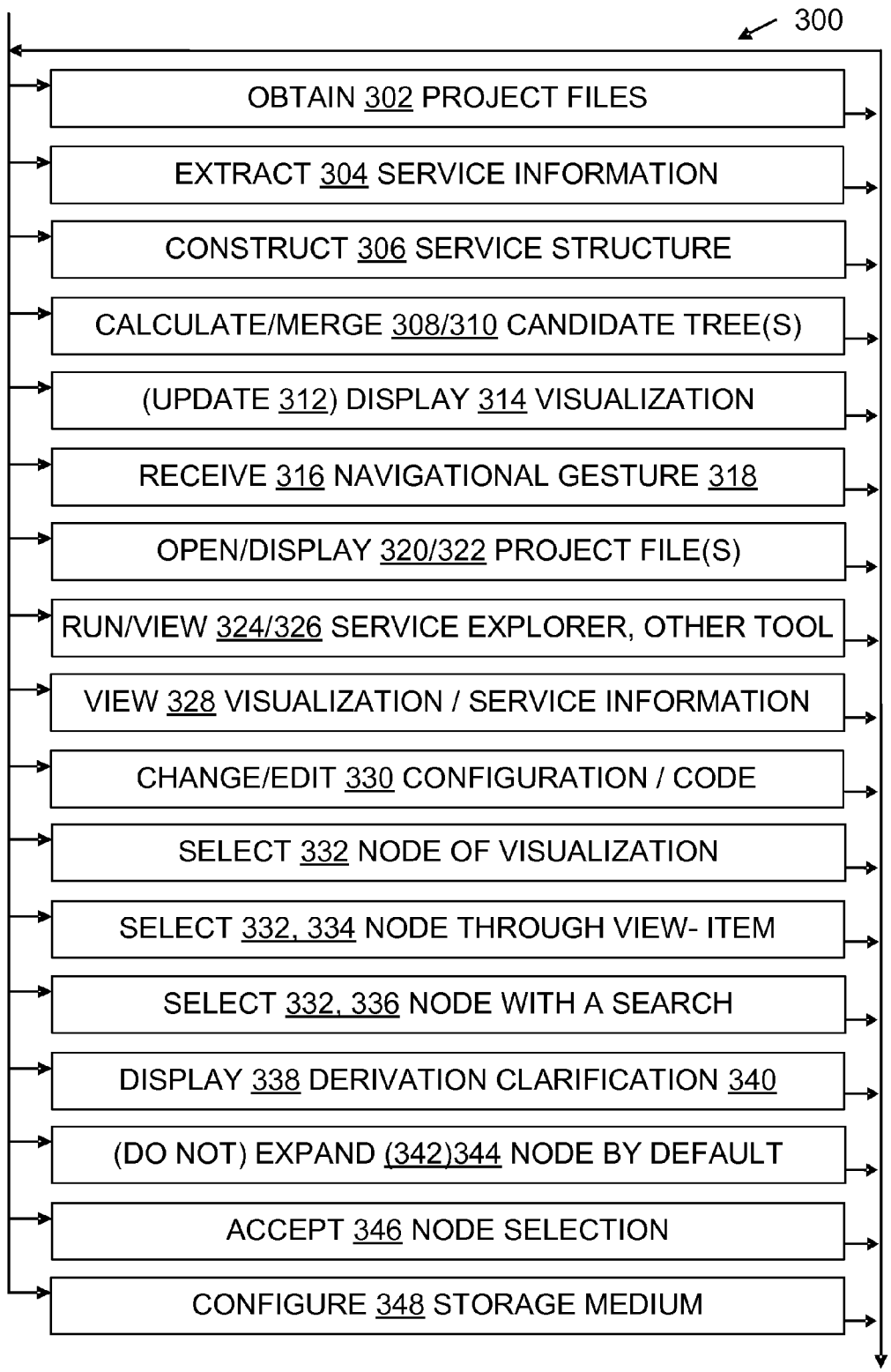
FIG. 3 is a flow chart illustrating steps of some process and configured storage medium embodiments.

With reference to FIGS. 1 through 3, some embodiments provide a computer system 102 with a logical processor 110 and a memory medium 112 configured by circuitry, firmware, and/or software to transform workflow service information as described herein.

For example, some embodiments include a computer system having a logical processor 110, a memory 112 in operable communication with the logical processor, and a hierarchical workflow service structure 214 residing in the memory. The service structure 214 has nodes 212 such as a service node 224, an endpoint node 226, an endpoint address node 228, an endpoint binding node 230, and an endpoint service contract node 232. A single node may fill one or more of these roles, but multiple nodes are contemplated.

A service explorer 202 residing in the memory includes instructions 206 which upon execution by a processor will result in a display to a user 104. For example, in some cases the service explorer 202 will display an automatically updated visualization 210 of the hierarchical workflow service structure 214 reflecting a change made to a configuration file 130 that is associated with a node 212. In some cases, the service explorer 202 will display an automatically opened file 124 which contains textual information (e.g., configuration values or source code) for a user-selected node 212 of the hierarchical workflow service structure. In some cases, the service explorer displays (or equivalently, causes display of) a tool 140, other than the service explorer, which has automatically received information for a user-selected node 212 of the hierarchical workflow service structure.

In some embodiments, the service explorer 202 instructions will extract workflow service information 218 from web application project files, and will construct the hierarchical workflow service structure 214 based at least in part on the extracted workflow service information. In other cases, the service explorer 202 visualizes and navigates the service structure 214 but does not construct it.

Some embodiments include a display 136 configured by a visualization 210 of the hierarchical workflow service structure 214. In some of these, an operation contract node 232, 234 associated with a selected service contract node 224, 232 is shown in an area of the graphical user interface 204 which is visually separated by a line from the selected service contract node. In some, a service contracts root node 232, 236 and a service endpoints root node 226, 236 are at the same level in the hierarchy. In some visualizations, a service contract node which has at least one subordinate operation contract node is unexpanded by default, that is, the subordinate node(s) are shown only after an explicit gesture from the user indicating that they should be displayed.

In some embodiments, the service explorer 202 includes instructions which upon execution will accept a visualization node 212 selection through a view-contract item 208 of the GUI 204 and then automatically display a file 124, 126, 134 which contains contract class source code service information for the selected node. In some, the service explorer 202 will accept a visualization node 212 selection through a view-implementation item 208 of the GUI 204 and then automatically display a file 124, 128, 134 which contains implementation class source code service information for the selected node. In some, the service explorer 202 will accept a visualization node 212 selection through a view-configuration item 208 of the GUI 204 and then automatically display a file 124, 130 which contains configuration service information for the selected node.

In some embodiments, the memory 112 is further configured by containing at least one of the following familiar tools 140: a tracing tool, a configuration tool, a client testing tool, a unit testing tool, a hosting option tool, a publishing tool. In some, one or more such tools 140 can be run by a user directly from within the service explorer 202, as opposed to exiting the service explorer and going back to an operating system, script interpreter, or other command interface for launching autonomous programs.

In some embodiments, the service explorer 202 includes instructions which upon execution will accept selection of an endpoint node 226 which represents an implicitly set endpoint, and then automatically display service information 218 which clarifies a derivation of the endpoint. In some, the service explorer 202 will accept selection of an endpoint node 226 which represents an explicitly set endpoint, and then automatically display an endpoint section 240 of a configuration file 130 for the endpoint.

In some embodiments, the service explorer 202 will accept selection of an address node 228 which represents an address that has an associated implicitly set endpoint, and then automatically display service information 218 which clarifies a derivation of the address. In some, the service explorer 202 will accept selection of an address node 228 which represents an address that has an associated explicitly set endpoint, and then automatically display an address section 240 of a configuration file 130 for the endpoint.

In some embodiments, the service explorer 202 will accept selection of a binding node 230 which represents a binding that has an associated implicitly set endpoint, and then automatically display service information 218 which clarifies a derivation of the binding. In some, the service explorer 202 will accept selection of a binding node 230 which represents a binding that has an associated explicitly set endpoint, and then automatically display a binding section 240 of a configuration file 130 for the endpoint.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, service application project files 124 may be on multiple devices/systems 102 in a networked cloud, a workflow service structure 214 may be stored on yet another device within the cloud, and the service explorer 202 and visualization 210 may configure a display 136 on yet other cloud device(s)/system(s) 102.

Processes

Figure 4:
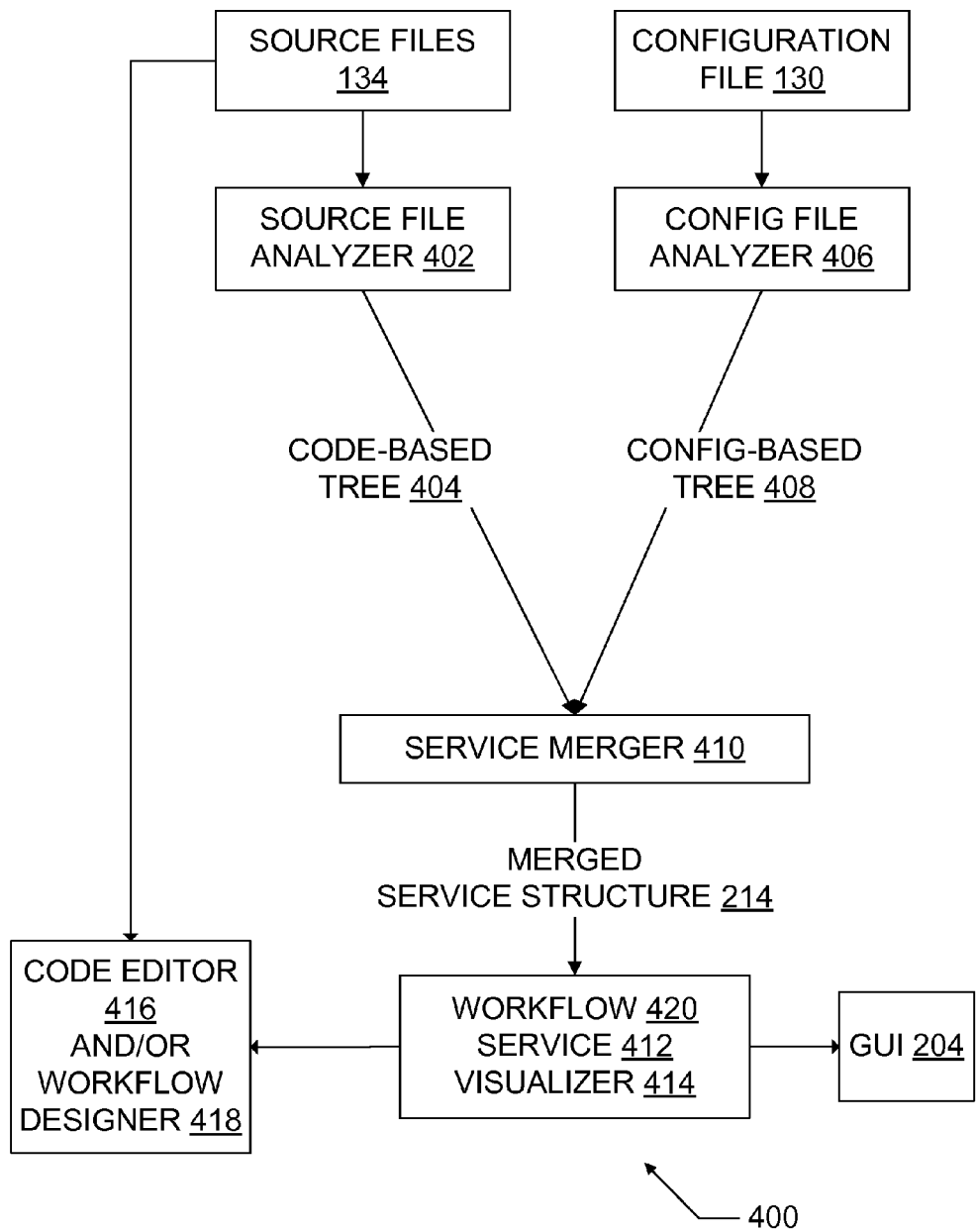
FIG. 4 is a data flow diagram illustrating construction and use of a workflow service visualization in an example architecture.

FIGS. 3 and 4 illustrate some process embodiments, in a flowchart 300 and a data flow diagram 400. Processes shown in the Figures may be performed in some embodiments automatically, e.g., by a service explorer 202 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps shown in the Figures may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a file obtaining step 302, an embodiment obtains files 124 which contain service information 218. Step 302 may be accomplished using file systems, networks, and/or other familiar mechanisms, for example, adapted to obtain service information files.

During an information extracting step 304, an embodiment extracts service information 217 from files 124. Step 304 may be accomplished using parsers, keyword searches, and/or other familiar mechanisms, adapted to extract service information 218 identified herein, for example.

During a service structure constructing step 306, an embodiment constructs a workflow service structure 214 which places the extracted service information in a hierarchical collection of nodes 212. Step 306 may be accomplished using familiar linked structure construction techniques adapted to construct hierarchical structures 214 as described herein with regard to node subordination, service information as content, links to tools 140, and the like. Step 306 may include steps 308 and 310 discussed below.

During candidate tree calculating steps 308, and a candidate tree merging step 310, candidate trees 216 are calculated from code models and configuration files and then merged, as part of constructing 306 a service structure.

During an updating step 312, the service structure 214 and visualization 210 are updated to reflect changes in configuration file 130 content, source file 134 content, and/or other service information. Step 312 may be accomplished in an IDE by tracking changes made with editors 244 and other tools 140, for example, to watch for possible changes to service information 218 and then updating the structure 214 accordingly. The visualized portions of the structure 214 (at least the visible portions) are likewise updated. In an alternative approach, filesystem modification dates for files 124 are noted when a structure 214 is created and polled, and files 124 are re-read into the structure 214 after their modification date changes, regardless of what content was changed. Other familiar update mechanisms may also be adapted for use with service structures 214, visualizations 210, and service information 218.

During a displaying step 314, an embodiment displays a visualization 210, e.g., by drawing the visualization in a GUI 204 or sending the visualization to a printer for printing. Step 314 may be accomplished using familiar graphics tools and techniques adapted to display visualizations in the form of hierarchies of node 212, for example.

During a gesture receiving step 316, an embodiment receives a navigational gesture 318, such as a node selection gesture (click, double-click, point, touch, etc.), a tool 140 launching gesture, and/or a zoom, pan, resize or similar gesture 318 for a window displaying a portion of a visualization, for example. Familiar human-computer interface tools and techniques may be adapted for use with visualizations 210 and navigation using visualizations as described herein.

During a file opening step 320, an embodiment opens a file 124, e.g., by using familiar filesystem mechanisms. For convenience, one may also refer to a user opening 320 a file, as shorthand for a user making gesture(s) which result in a mechanism opening the file.

During a file displaying step 322, an embodiment displays content of a file 124, e.g., by using familiar filesystem and display mechanisms. Displaying step 322 corresponds generally to viewing step 328, with the understanding that step 328 is from a developer perspective while step 322 is from a system or architecture perspective.

During a software running step 324, also sometimes referred to as a software launching step 324, an embodiment runs software (after launching the software if it has not previously been launched), such as a service explorer 202 or a development tool 140. Familiar software launch and execution mechanisms may be used.

During a software viewing step 326, a user views software such as a service explorer 202 or a development tool 140. Step 326 corresponds generally to step 324, with the understanding that step 326 is from a developer perspective while step 324 is from a system or architecture perspective.

During a visualization/service information viewing step 328, a user views a visualization 210 and/or views service information 218 in a service explorer 202. Step 328 corresponds generally to visualization displaying step 314 and project file displaying step 322, with the understanding that step 328 is from a developer perspective while steps 314 and 322 are from a system or architecture perspective.

During a configuration editing step 330, which is also referred to as making 330 a configuration change or as changing 330 a configuration, a user (or an embodiment operating on behalf of a user) changes content of a configuration file 130 or other workflow configuration service information 218. Familiar tools 140 and/or editing subroutines of a service explorer 202 can be used, for example.

During a node selecting step 332, a user (or an embodiment operating on behalf of a user) selects one or more nodes 212. Node selecting step 332 may be accomplished using a GUI, keyword searches, and/or other mechanisms adapted to select visualization nodes 212, for example.

Specifically, during a view-item node selecting step 334, which is an example of step 332, a user or embodiment selects a node 212 using a GUI view-item 208, e.g., a view-contract item, a view-implementation item, or a view-configuration item.

Similarly, during a search-based node selecting step 336, which is an example of step 332, a user or embodiment selects a node 212 using a search, such as a search for a keyword, a search for a date or other value in a specified range, and/or a search for nodes which reference or depend on a particular node. Familiar search mechanisms may be adapted for use in searching nodes 212, for example.

During a derivation information displaying step 338, an embodiment displays information 340 which clarifies a derivation of an endpoint, an address, or a binding which has been set implicitly instead of being set explicitly by a developer. Step 338 may be part of visualization displaying step 314 and/or file displaying step 322.

During a node expanding step 344, an embodiment displays 314 a node 212 by default as expanded, whereas during a node non-expanding step 342, also referred to as a node unexpanding step 342, an embodiment displays 314 a node 212 by default as not expanded. Undoing expansion of a node is referred to as contracting the node, and occurs after a node has been displayed in an expanded manner.

During a node selection accepting step 346, an embodiments accepts (e.g., receives) a selection of a node. Step 346 corresponds generally to step 332, except that step 346 is from a system or architecture perspective while step 332 is from a developer perspective.

During a memory configuring step 348, a memory medium 112 is configured by a visualization 210, a service explorer 202, a workflow service information structure, and/or otherwise in connection with web-based workflow service information visualization and navigation as discussed herein.

FIG. 4 illustrates one of many possible architectures for implementing some embodiments. Web application source file(s) 134 are read by instructions 206 in a source file analyzer 402 to locate service information 218, such as names, code, and other information about contract classes and implementation classes. The source file analyzer 402 embeds the extracted service information (or equivalently, references to it such as path names and file names, and file offsets) in a code-based tree 404. Web application configuration file(s) 130 are read by instructions 206 in a configuration (a.k.a. config) file analyzer 406 to locate service information 218 such as endpoint 226, address 228, and binding 230 node content. The config file analyzer 406 embeds the extracted service information (or equivalently, references to it) in a config-based tree 408. On a given pass through the illustrated data flow, the trees 404, 408 may have been previously calculated 308 by the analyzer(s) 402, 406, or one or both trees may be (re)calculated by the analyzer(s) during the pass in question. The trees 404, 408 are then merged 310 by instructions 206 in a service merger 410 to form a comprehensive service structure 214.

Continuing this example, the service structure 214 is read by instructions 206 in a service 412 visualizer 414, which controls a GUI 204 to display a visualization 210 of the structure 214. During navigation of the visualization 210 by a developer 104, node selection and/or other gestures may cause control to be passed from the GUI to a code editor 416 to view 328 or edit 330 source code 134, for instance. Control may also be passed to a configuration editor 244, or to a workflow designer 418 to further design the workflow 420 service 412, and/or to other tools 140, from within the service explorer GUI 204.

The foregoing steps and their interrelationships are discussed in greater detail below, in connection with various embodiments.

Some embodiments provide a process for transforming web application workflow information. From an architectural perspective, the process obtains 302 web application 120 project files 124 which include, in this example, at least one workflow 420 implementation source file 128, 134 and at least one workflow configuration file 124, 130. This process extracts 304 workflow 420 service information 218 from the web application project files 124. Extraction may include, for instance, extracting 304 at least one (or two, or three, etc.) of the following pieces of workflow service information 218: a service class name, a service contract name, a service operation contract name, a service endpoint address, a service endpoint binding type, a service implementation class name. This process then constructs 306 a workflow service structure 214 based on (i.e., including and/or derived from) the extracted workflow service information 218.

In some embodiments, the process extracts 304 workflow service information from web application project files which match a specific usage pattern. For example, in some cases the service contract 126, implementation 128, hosting 132, and configuration 130 files all reside within a single project 122. In some cases, a service contract resides in a first project, whereas service implementation, hosting, and configuration files reside in one or more other projects. In some cases, a service contract resides in a first project, a service implementation file resides in a second project, and hosting and configuration files reside in a third project.

In some embodiments, the process constructs 306 a workflow service structure including workflow service information for a service contract for a service that is defined implicitly using Receive activities. In some, the process constructs 306 a structure 214 for a service contract for a web API service in which binding information is optional.

In some embodiments, the constructing step 306 includes calculating 308 a code-based candidate service tree 404 from a code model (e.g., source 134 codes), and calculating 308 a config-based candidate service tree 408 from a configuration file 130. The constructing step 306 subsequently or concurrently merges 310 the code-based candidate service tree and the config-based candidate service tree to build the service structure 214 in memory 112.

Some embodiments store the service structure 214 for later use, such as for later visualization or later use by analytic tools 140. Some promptly display 314 a visualization of the workflow service structure in a graphical user interface. In some cases, the displayed visualization 210 shows a hierarchy of nodes 212. In some of these, a service endpoint binding node 224, 226, 230 is shown and treated (e.g., for expand/contract purposes) as subordinate to a service class node 224 such as a contract or implementation class node. In some cases, a service endpoint address node 224, 226, 228 is subordinate to a service endpoint binding node 224, 226, 230. In some, a service contracts root node 224, 232, 236 and a service endpoints root 224, 226, 226 node are at the same level (same distance from the root node) in the hierarchy.

In some cases, with some embodiments, after a user 104 selects 332 a service contract node 232 within a first area of the graphical user interface 204, operation contract node(s) 234 associated with the selected service contract node are shown in a second area of the graphical user interface which is visually separated from the first area.

In some embodiments, the process receives 316 a navigational gesture 318 through the graphical user interface 204. The gesture effectively selects 332 a node 212 of the workflow service structure 214. In response, the embodiment opens 320 web application project file(s) which contain service information 218 (e.g., source or configuration values) that was used in constructing 306 the node in the workflow service structure.

From a developer's perspective, some embodiments provide a process for facilitating the developer's use of web application workflow information 218. For example, in some processes the developer 104 runs 324 a service explorer tool 202 in an integrated development environment 138 or as a stand-alone version. The developer views 326 a visualization 210 of a hierarchical workflow service structure 214, in a graphical user interface 204 of the service explorer tool 202. Then the developer performs some action. Some suitable actions include, in this example, making 330 a change in a configuration file and then viewing 328 an automatically updated 312 visualization which reflects the change.

As further illustration, some other suitable actions include selecting 332 a node 212 of the visualization through the graphical user interface, and then viewing 328 an automatically opened web application project file 124 which contains service information 218 for the selected node. Some other suitable actions are selecting 332 a node of the visualization through the graphical user interface, and then viewing 326 a web application project tool 140 which has automatically received service information 218 for the selected node. As yet additional illustration, some other suitable actions include selecting 332 a node of the visualization through the graphical user interface, and then editing 330 configuration settings 242 through a service configuration editor 244 (a type of tool 140) which is run for the selected node. The tool 140 may be, for example, a tracing tool, a configuration tool, a client testing tool, a unit testing tool, a hosting option tool, or a publishing tool. Other actions described herein may also be presented as suitable actions within a given embodiment.

In some embodiments, the visualization 210 has nodes 212 which represent a Windows® Communication Foundation (WCF) service type 220, but other service types 220 may also be visualized (mark of Microsoft Corporation). Some examples of WCF service types 220 are a WCF Core Service, a WCF Workflow Service, a WCF Web API Service, a WCF RIA Service, a WCF Data Service, a WCF Workflow Component Service. Other SOAP and/or REST service types 220 may also be visualized in some embodiments.

In some embodiments, the developer selects 332 a node 212 of the visualization through a view-contract item 208 of the graphical user interface 204, and then views 328 an automatically opened web application project file 124 which contains contract class source code service information 218 for the selected node. In some, the developer selects 332 a node 212 through a view-implementation item 208 and views an automatically opened file 124 which contains implementation class source code service information 218 for the selected node. In some, the developer selects 332 a node 212 through a view-configuration item 208 and views an automatically opened file 124 which contains configuration service information for the selected node.

In some embodiments, the developer selects 332 a node 212 at least in part by searching 336 for particular node content or node characteristics. For example, in some cases a search can specify a service name, a service contract name, and/or an operation name as service information being sought in a node.

In some embodiments, an endpoint node 212, 226 representing an endpoint is selected 332, and the endpoint was set implicitly. The developer can view 328 automatically displayed 338 service information 218, 340 which clarifies a derivation of the endpoint. Similarly, in some embodiments an address node 212, 228 representing an address is selected, and an endpoint associated with the address was set implicitly. The developer can then view 328 automatically displayed 338 service information 218, 340 which clarifies a derivation of the address. Likewise, in some embodiments a binding node 212, 230 representing a binding is selected 332, and an endpoint associated with the binding was set implicitly. The developer can view 328 automatically displayed 338 service information 218, 340 which clarifies a derivation of the binding.

In some embodiments, the developer can view 328 a visualization of a workflow service structure in which a project node 222 is expanded by default, a service node 224 is expanded by default, and/or an endpoint node 226 is expanded by default. The expanded endpoint node 226 may show subordinate node(s) such as address 228, binding 230, and/or service contract 232 nodes.

Configured Media

Some embodiments include a configured computer-readable storage medium 112. Medium 112 may include disks (magnetic, optical, or otherwise), RAM, EEPROMS or other ROMs, and/or other configurable memory, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as workflow service structures 214, visualizations 210, and a service explorer 202, in the form of data 118 and instructions 116, read from a removable medium 114 and/or another source such as a network connection, to form a configured storage medium. The configured storage medium 112 is capable of causing a computer system to perform process steps for transforming data through workflow service visualization and navigation as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from WCF Service Explorer documentation. WCF Service Explorer is a program designed and implemented by Microsoft Corporation. Aspects of the WCF Service Explorer program and/or documentation are consistent with or otherwise illustrate aspects of the embodiments described herein. However, it will be understood that WCF Service Explorer documentation and/or implementation choices do not necessarily constrain the scope of such embodiments, and likewise that WCF Service Explorer and/or its documentation may well contain features that lie outside the scope of such embodiments. Features described here are not necessarily part of any commercially available product, WCF Service Explorer or otherwise. It will also be understood that the discussion below is provided in part as an aid to readers who are not necessarily of ordinary skill in the art, and thus may contain and/or omit details whose recitation below is not strictly required to support the present disclosure.

WCF Service Explorer Overview

WCF Service Explorer presents WCF services as a whole to customers 104 instead of as separate code, config and host-specific files 124. The Service Explorer allows customers to navigate to specific file locations that they can view, edit and use specific tools to develop their WCF services.

When authoring a new WCF service or looking at an existing WCF service, developers can benefit from understanding all WCF artifacts, such as service contracts, service implementations, service endpoint, service behavior, .svc file, etc. and the relationship among them, such as the service name and service contract between configuration and code, the service name between .svc and service implementation, etc. Microsoft® Visual Studio® environments (marks of Microsoft Corporation) and other familiar IDEs 138 may provide a set of tools to help authoring, configuring, testing and trouble-shooting WCF services, but in some situations discoverability, for example, can be improved to increase the usefulness of such tools. WCF Service Explorer can help exploration of WCF service artifacts and navigation among WCF service artifacts to make them more manageable for developers.

WCF has different service flavors, with different gestures for service concepts. WCF Service Explorer can help present all WCF services in a convenient way based on different service flavors. For example, the Service Explorer could visualize the service contract for a WCF WF service that is defined implicitly using Receive activities, and it can also visualize the service contract for a WCF Web API service that can avoid showing binding info. The Service Explorer can be a discoverable entry point for available tools 140. Going forward, the Service Explorer can be a component designer for the WCF component in an AppFabric AppModel.

Scenario: Authoring a WCF Service in a Project

Alice is new to WCF technology. She opens an IDE 138 and tries to create a new WCF service project. She finds quite a few different concepts such as service contract, service implementation, configuration and svc file, by reading WCF books, and finds it challenging to go ahead without clearly understanding the relationship between them. With WCF Service Explorer, Alice can view her service as a whole, from the start. She can see how the different parts are composed and work together, which illustrates for her the concept of a service. She avoids struggling to understand complex details of WCF technologies as a beginner. She also feels it is easier for her to map the service concept to the complex WCF details.

When Alice starts to implement her services, she also easily finds useful tools 140 that can help her development, such as tracing tool, configuration tool, test client tool, unit testing tool, hosting option tool, publishing tool, and so on. Alice now has confidence that she can go through the hard time at the beginning. She will go ahead using WCF and ultimately become an expert.

Scenario: Continuing Development of an Existing WCF Service

Elvis is adding functionalities to an existing WCF service project 122 developed by his colleagues in the last release. He plans to allocate significant time to understand the project first, and then starts his development work. When Elvis opens the project in an IDE 138, he notices there is a WCF Service Explorer tool. With this tool, he can view WCF services and their structures within a solution. When Elvis starts to add functionalities, he also finds that WCF Service Explorer concentrates the entry points to other useful WCF tools 140 that can help his development, making it convenient to log and view trace info, launch a scenario-based configuration tool, conduct ad hoc testing, and so on. Each entry point appears at a convenient point in his navigation of the WCF structure. Elvis will finish his project ahead of schedule.

The foregoing scenarios are illustrative, not limiting.

User Experiences

As part of a UI (user interface) overview of WCF Service Explorer, consider the following example of a visualization. In a commercial product, the visualization would likely appear in a window or panel, with graphical features such as colored text and icons, for example. However, a wide variety of implementations are possible, so rather than limiting (or appearing to limit) the possible approaches to a particular depiction, visualizations are represented below using a graphics-neutral format of hierarchically arranged text, with each line representing a node, and with indentation and line position reflecting the hierarchy. As elsewhere herein, any apparent hyperlinks are not meant to be live, not meant to be followed from this document, and not meant to incorporate material into this document by reference; the apparent hyperlinks are instead merely examples.

```
FooService
    FooService.Service1
        basicHttpBinding_IService1
            http://<hostAddress>/<Service1.svc>
            basicHttpBinding
            FooService.IService1
                DemoOperation1
                DemoOperation2
        netTcpBinding_IService1
            net.tcp://<hostAddress>/<Service1.svc>
            netTcpBinding
            FooService.IService1
                DemoOperation1
                DemoOperation2
        mexEndpoint
    FooService.Service2
        basicHttpBinding_IService1
        netTcpBinding_IService1
BarService
    BarService.Service1
```

A first alternative for UI layout is shown below. This alternative has a separate UI area for operations. When a developer clicks on a service contract node, the operation contracts will be shown in the separate area. This helps avoid duplicated operations in multiple endpoints.

```
FooService
    Service1
        Endpoint1
            http://...
            basicHttpBinding
            FooService.IService1
        Endpoint2
            net.tcp://
            netTcpBinding
            FooService.IService2
    Service2
        Endpoint1
BarService
    Service1
- - - - - - - - - - - - - - - - - - - - - - - - - - - - - -
DemoOperation1
DemoOperation2
```

A second alternative for UI layout is shown below. This alternative organizes each Service node by "Service Contract" and Endpoint" under respective root nodes 236.

```
FooService
    Service1
        Service Contracts
            FooService.IService1
                DemoOperation1
            FooService.IService2
                DemoOperation2
        Endpoints
            Endpoint1
                Address
                Binding
                Contract
    Service2
BarService
    Service1
```

Shown below are some example naming rules used in constructing a visualization. Other rules can also be used.

| Node | Example | Naming Rule |
|---|---|---|
| Project | FooService | Project name |
| Service | FooService.Service1 | Service class name |
| Endpoint | basicHttpBinding_IService1 | Application endpoint: Composition of binding type and service contract<br>mexEndpoint: Standard endpoint |
| Address | Absolute Address | Service endpoint absolute address |
| Binding | basicHttpBinding | Binding type |
| Service Contract | FooService.IService1 | Service contract name |
| Operation Contract | DemoOperation1 | Service operation contract name |

With regard to icons, in a first category a "Refresh" tooltip on icons allows the developer to refresh nodes 212, and a "Tree View Settings" tooltip has options to show/hide specific nodes, such as showing service node only, etc. In a second category, a "View Contract" tooltip item 208 will open a node-specific source code file including C#/VB code file and XAML file and go to the specific contract class; this opening is contextually sensitive to a selected node. A "View Implementation" tooltip item 208 will open a node-specific source code file including C#/VB code file and XAML file and go to the specific implementation class; this opening is also contextually sensitive to a selected node. A "View Configuration" tooltip item 208 will open a configuration file, and is likewise contextually sensitive to the selected node. In a third category, a "Configure WCF Configuration" tooltip item 208 lets a developer view and update configuration settings by launching a Service Configuration Editor 244, and will be shown when the developer is choosing a specific Project Node, Service Node, or Endpoint Node.

A "Search" box can specify Service Name, Service Contract Name, or Operation Name. A search 336 will go to the first node that matches, and in this example will highlight the other nodes that match the search criteria. A Click Stop next will search for all nodes.

As to Scope of service information 218, for creating a WCF service application, customers can adopt different usage patterns (described above), by placing the service contract, implementation, hosting and configuration information in one or more projects 122. Different projects may use different patterns. In some approaches, Scope is defined as follows. For a Project node 22, Scope includes all the projects in the IDE solution. For a Service node 224, Scope includes all WCF service implementation classes defined in a project. As to Endpoint 226, some endpoints are defined explicitly in a config file 130; some endpoint capability is implicitly defined by a protocol mapping configuration element in machine.config or in project config file, and some endpoints are implicitly defined by a service host factory. Endpoints defined in code are outside the Service node Scope in this example.

For an Address node 228, Scope will include a service absolute address, which involves composition when the host based address cannot be recognized at design time, such as http://<hostAddress>/Service1.svc/ [relativeaddress]. Alternately, a relative address is used.

For a Binding node 230, a Click Stop 1 shows binding type and a tooltip will describe the usage pattern of this binding. A Click Stop 2 shows binding elements of each binding type.

For a Service Contract node 232, Scope includes all service contracts that a service will implement, noting that a contract can be defined in this project or can be defined in another project and referred to by this project. The service contract can be different WCF service types 220. Service Contract node Out of Scope for this example occurs if a service contract is defined but is not implemented by a service class, or these contracts could be shown in separate nodes after all service nodes. A Callback contract is also Out of Scope in this example.

For an Operation Contract node 234, Scope in this example includes all operation contracts defined for the service contract. For a WCF Workflow Service node, Scope includes all Receive activities defined for the service contract.

Navigation—Double Click Behavior

A familiar, but not necessarily required, mechanisms for selecting items in a GUI is double clicking on them. In this example, selecting 332 a node by double clicking has the following results. For a Project node, collapse/expand the project node. For a Service node 224, go to the service implementation class in the code; for a WCF Workflow service, go to the first Receive activity.

For an Endpoint node 226, if the endpoint was explicitly set, go to the related endpoint section in the configuration file. If the endpoint was implicitly set, a Tooltip of the node shows where the endpoint info is derived from, e.g., when the host will provide an endpoint for each service contract that the service has implemented and for each protocol enabled in the host, and the protocol info is specified by <protocolMapping> configuration element or service host factory. Then go to the first line of <system.serviceModel> section in the configuration file.

For an Address node 228, if the endpoint was explicitly set, go to the address attribute in the configuration file 130. If the endpoint was implicitly set, a Tooltip of the node shows 338 where the endpoint address is derived from, e.g., when the endpoint address will be based on the IIS base address and the protocol address scheme. The base address will be appended with the contract name to determine the endpoint address. Then go to the first line of <system.serviceModel> section in the configuration file.

For a Binding node 230, if the endpoint was explicitly set, go to the binding attribute in the configuration file. If the endpoint was implicitly set, a Tooltip of the node shows 338 where the binding is from, e.g., it is specified by <protocolMapping> configuration element or service host factory. Then go to the first line of <system.serviceModel> section in the configuration file.

For a Service Contract node 232, if the service interface is defined in this current project, then go to the service interface definition in the code; for WCF Workflow Service, go to the first Receive activity. If the service interface is defined in another project and referred to this project, a Tooltip of the node shows this service contract is defined in a referenced assembly, and in this example the developer does not navigate directly there.

For an Operation Contract node 234, if the service interface is defined in this current project, then go to the operation contract definition in the code; for a WCF Workflow Service, go to the Receive activity. Note that in an HttpMessageService stack as well as the Http bindings, the [WebGet] and [WebInvoke] attributes on operations will map to the appropriate Http methods like Get, Put, Post, etc. In one approach a Service Explorer 202 visualizes all the Gets together, all the Posts together, etc. Developers 104 can also view a UriTemplate defined in the attribute. If the service interface is defined in another project and referred to this project, a Tooltip of the node shows this operation contract is defined in a referenced assembly, and this example the developer does not navigate directly there.

Navigation to Code/XAML/XML Configuration—Context Menu

In some approaches, context menu navigation is provided as follows. For a Project node, context menu navigation is not applicable in this example, and there is no user navigation experience to code/XAML/XML Config for Project nodes.

For a Service node 224, a View Service Implementation Code context menu item 208 allows the developer to navigate to the same code as double clicking (described above). A View Service Contract Code context menu item 208 allows the developer to navigate to the same code as double clicking of Service Contract node. As for a View Configuration context menu item 208, if this service is explicitly specified in <services> section of the configuration file 130, navigation goes to the specific name attribute. If this service isn't explicitly specified in the configuration file, the view 328 goes to the first line of <system.serviceModel> section in the configuration file.

For an Endpoint node 226, an Address node 228, or a Binding Node 230, a View Configuration context menu item 208 allows the developer 104 to navigate to the same configuration location as double clicking.

For a Service Contract node 232, a View Service Contract Code context menu item 208 allows the developer to navigate to the same code as double clicking. A View Service Implementation Code context menu item 208 allows the developer to navigate to the same code as double clicking. As for a View Configuration context menu item 208, for the endpoint explicitly set, go to the related endpoint contract attribute in the configuration file 130, and for the endpoint implicitly set, go to the first line of <system.serviceModel> section in the configuration file 130.

For an Operation Contract node 234, a View Operation Contract Code context menu item 208 allows the developer to navigate to the same code as double clicking. A View Operation Implementation Code context menu item 208 allows the developer to navigate to the operation implementation class in the code.

Navigate to WCF Tools—Context Menu

In some approaches, context menu tooling entry points to run 324 tools 140 are provided as follows.

For a Project Node, and WCF Configuration for all services in the project, a "Configure with Service Configuration Editor" Tooling Entry Point launches SvcConfigEditor to configure WCF service. For tracing, an "Enable Tracing" entry point enables logging trace, and a "View Trace Log" entry point launches Service Trace Viewer to view the log file. For hosting, a "View Host Server Settings" entry point and a WCF Service Application will navigate to the Properties tab to view hoster info, and one can choose among ASP.NET Development Server, IIS Express, local IIS, AppFabric, Dev Fabric, or self-host. A WCF Service Library will navigate to the host section in the configuration file. For testing, and a "Test WCF Services" entry point, if the project contains only one service, instructions 206 will launch WcfTestClient or web-based HTTP Test Client according to the service type: WCF Core/WF service or WCF WEB API service. If the project contains multiple services, the service explorer 202 will list all the available services so the developer can choose one to test, and launch WcfTestClient or web-based HTTP Test Client according to the service type: WCF Core/WF service or WCF Web API service. For publishing, a "Publishing . . . " entry point and a "Package/Publishing Settings" entry point will behave as in Microsoft® Solution Explorer (mark of Microsoft Corporation). For unit testing, a "Create Unit Test . . . " entry point will create a unit test for all services in the current project. For adding a new service, "Add→New Item . . . " and "Add→Existing Item . . . " entry points will behave as in Solution Explorer.

For an Endpoint Node 226, and WCF Configuration for this endpoint, a "Configure with Service Configuration Editor" entry point provides help with viewing and configuration tasks such as security, performance, enabling debug, enabling metadata, etc. An "Add a New Endpoint" entry point will let a developer configure values to add a new endpoint. For testing, a "Test WCF Service" entry point will launch WcfTestClient if the service type is WCF Core or WF services, and launch web-based HTTP Test Client if the service type is WCF Web API service or HttpMessageService.

User Experience: Updating Behavior of WCF Service Explorer

In some approaches, a "Service Explorer" tab will be updated to reflect the latest changes as follows. As to changes on services in C#/VB code/XAML code/project Configuration file, the changes will be reflected on WCF Service Explorer all at once without saving the file. As to adding or removing the service related C#/VB/XAML/project Configuration file, the changes will be reflected on WCF Service Explorer all at once without saving the file. As to changes for <protocolMapping> element in machine.config, the changes will be reflected on WCF Service Explorer after closing the IDE and re-opening the IDE next time. As to adding a new service item to the project, the changes will be reflected on WCF Service Explorer all at once without saving the file. As to pressing a "Refresh" icon or other refresh gesture, the changes will be reflected on WCF Service Explorer after pressing the button. This provides a safeguard to cover corner cases. As to switching back to "WCF Service Explorer" from "Solution Explorer" or other views, the changes will be reflected on WCF Service Explorer after it becomes the active view.

As for relationships among WCF concepts, some approaches organize a service explorer with three major layers: project, services and endpoints. At the project level, a developer can view all services in the project 122. At the service level, these explorers treat "Service" as a center to organize all related WCF concepts as a whole, e.g., they enumerate all available endpoints under the service node 224. At the endpoint Level, a developer can view the endpoint as whole to see the how, what and where info the service uses to communicate with world outside the service. For instance, the developer can view 328 address, binding and contract info of this endpoint. Under Service Contract, these explorers enumerate all operation contracts.

With regard to navigation, some service explorers provide developers with the following functionality. As to navigation from the Service Explorer to code for specific UI component in the Explorer (View Code 134), one can go to: service implementation type, service operation implementation in code, service contract definition in code, operation contract in code, operation parameter type definition, contract behavior attribute in code, operation behavior attribute in code. In some approaches, one can navigate from the Service Explorer to a WF designer if the service type is WF service (View 326 Designer). As for navigation from the Service Explorer to configuration 130 for specific UI component in the Explorer (View 328 Configuration), one can go to: service configuration or indicate if it is using default config, endpoint configuration or view an indication if it is a default endpoint, binding configuration, binding element within a custom binding configuration, service behavior attribute or config if defined in local config file, or view an indication if it is inherited, endpoint behavior configuration if defined in local config file, or indicate if it is inherited. In some, one can navigate back to the Service Explorer, e.g., one approach will show the Service Explorer for the whole service with the specific navigated component highlighted, so that customers can always have a full view of the service concept. With regard to an App Model, in some approaches one can navigate from an App Model designer to the Service Explorer, and from the Service Explorer back to the App Model designer.

Some approaches are designed with particular attention to the possibility that a WCF Service Explorer will support all kinds of WCF flavors. Each WCF flavor may involve a different UI tree hierarchy, and call for different WCF tools to be exposed. Some approaches thus promote an extensible Service Explorer.

With regard to node structure, some approaches proceed as follows. To separate a logic layer and a presentation layer, a Node class is defined. The Node class has a "SubNodes" property, so several Node class instances can be used when constructing a logic tree, which is the logic layer of the final tree view. One Node class instance defines "Name", "Icon", "IsDefaultExpanded", "MouseDoubleClickCommand", "ContextMenus" and some other properties of the tree node. Anything updated in the logic layer will immediately show in the UI tree view layout.

For different kinds of nodes, different classes that inherit from Node class are defined. For example, a defined ProjectNode class inherits from Node class. In the ProjectNode, one can customize the node icon and add new context menus for the node. As for CoreServiceNode and WFServiceNode, they have different MouseDoubleClickCommand, so they can inherit from the same ServiceNode and override the MouseDoubleClickCommand themselves. One can add more kinds of nodes, and the tree structure can be extended.

More specifically, some approaches use the following classes. A Node Abstract Class has Properties: ContextMenus, Icon, IsDefaultExpanded, MouseDoubleClick, Name, and SubNodes, has a Method Node, and may have NestedTypes. A SolutionNode Class inherits from Node, has a Field solution, has Properties Icon and Name, and has a Method Solution Node. A ProjectNode Class inherits from Node, has a Field project, has Properties ContextMenus, Icon and Name, and has Methods EditWithConfigEditor and ProjectNode. A ServiceNode Class inherits from Node, has a Field name, has Properties Icon and Name, and has a Method ServiceNode. An EndpointNode Class inherits from Node, has Properties Icon and Name, and has a Method EndpointNode. An AddressNode Class inherits from Node, has a Field address, has Properties Icon and Name, and has a Method AddressNode. A BindingNode Class inherits from Node, has a Field binding, has Properties Icon and Name, and has a Method BindingNode. A ContractNode Class inherits from Node, has a Field contract, has Properties IsDefaultExpanded, Icon and Name, and has a Method ContractNode. An OperationNode Class inherits from Node, has a Field operation, has Properties Icon and Name, and has a Method OperationNode. A WFServiceNode Class inherits from ServiceNode, has a Field activity, has a Property MouseDoubleClick, and has Methods MouseDoubleClick and WFServiceNode. A CoreServiceNode Class inherits from ServiceNode, has a Field codeElement, has a Property MouseDoubleClick, and has Methods MouseDoubleClick and CoreServiceNode.

Some approaches define service managers, such as a Core Service Manager, a WF Service Manager, and perhaps others. Each service manager takes responsibility to calculate and maintain one kind of service. So for each project in a solution, each service manager calculates their services and adds them to ProjectNode. When users edit something which leads to the service changed, it is up to the service manager to listen to code changed event and update 312 the tree view. The service manager can directly update the logic layer tree, because everything updated in the logic layer will show in the UI tree view directly. In such an architecture, one can readily extend the set of services, using inheritance from a ServiceManager class. Different service manager flavors may be used, e.g., so that opening any Http-based service (no matter which underlying service host supports it) gives the developer an Http-specific experience.

To calculate a final service tree, one calculates 308 a candidate service tree 404 from a code model and a candidate service tree 408 from a config file. One merges 310 these trees together. In the following square brackets ([node]) denotes a code model service tree node, and angle brackets (<node>) denotes to a config service tree node.

For example, in the course of the data flow shown in FIG. 4, a source file analyzer 402 may analyze a CodeModel to calculate a [service] tree such as

```
+[service]
   +[contract]
      +[operation]
```

Similarly, in the course of the FIG. 4 data flow a config file analyzer 406 may analyze a Config to calculate a <service> tree such as

```
+<service>
   +<endpoint>
      +<address>
      +<binding>
      +<contract>
```

The [service] tree and the <service> tree are then merged, in this example, to generate an output service tree as part of structure 214.

Calculate Candidate Service Tree from Code Model

Microsoft® Visual Studio® technology, for example, provides the code model for a project which contains all the code elements definition and relationship (marks of Microsoft Corporation). This code model is different from reflection. When users edit a code file without saving, the code model is updated, and one can get a code model from compiling error code. So the code model can get the design time code structure. Some approaches use this code model to calculate 308 the service tree. In the diagram above, the illustrative code model service tree has three layers: [service], [contract] and [operation]. To get the [service] list, one approach searches all the code elements in the code model, consistent with the following:

```
if (IsClass( ) && !IsAbstract( ))
{
    if (!InheritFromClientBase( ))
    {
        if (HasServiceContractAttribute( )
          || OneOfInheritedInterfacesHasServiceContractAttribute( ))
        {
        }
    }
}
```

If a [service] class has ServiceContractAttribute, it is a [contract] itself. Otherwise, any of the [service] class's interfaces that have ServiceContractAttribute are treated as being a [contract]. All the methods in [contract] which have OperationContractAttribute are [operation]. In some implementations, this processing can reuse code from a Config IntelliSense® feature or similar autocompletion technology (mark of Microsoft Corporation).

Calculate Candidate Service Tree from Config File

If a config file is not open, some approaches read the config text from the hard disk. If a config file is open, they get the config text from a textual editor. The textual editor will provide the design time text. So if users modify something in config without saving, one can also get the latest config text. In the diagram above, the illustrative config service tree has <service>, <endpoint>, <address>, <binding> and <contract> node. One can use the XPath to get these values. For example, one can use the following XPath to get the endpoint element: /configuration//system.serviceModel/services/service[@name='{0}']/endpoint One gets the protocol mapping list from the config, for subsequent use. In addition to the config file in the current project, some approaches also calculate with the machine.config. The current project config will override the config element in the machine.config.

Merge Code Model Service Tree and Config Service Tree

Three cases are considered in this illustration of merger 410 functionality.

First case: If one [service] is mapping with <service>, which means a service has config definition, one uses the config service tree as the final tree. For each <contract>, the merger will find the corresponding [contract]. If [contract] is found, the merger will use its [operation] list. If there is no [contract] corresponding to the <contract>, which means the <contract> is wrongly defined, no operations will show. In the example, this results in final tree:

```
+<service>
   +<endpoint>
      +<address>
      +<binding>
      +<contract> <-> [contract]
          +[operation]
```

Second case: If a [service] has no <service> mapping to it, which means the service is using config simplified feature, for each binding type in protocol mappings, and for each [contract], an endpoint is added to the final service tree as following:

```
+[service]
   +endpoint
      +empty address (e.g., filler node 238)
      +bindings from protocol mapping
      +[contract]
         +[operation]
```

Third case: If a <service> has no [service] mapping to it, it may be that the service is defined in reference assemblies or that users have defined something wrong. Accordingly, the service merger 410 does not provide a service tree in this case.

Update Service Tree

Some approaches listen to the following events and recalculate the service tree when the events are triggered.

| Event | When the event happens |
|---|---|
| ProjectsChanged | adding/removing a new WCF project |
| ProjectItemsChanged | adding/removing a C#/VB file |

| Event | When the event happens |
| --- | --- |
| RefrencesChanged | adding/removing a new reference assembly |
| CodeModelChanged | editing in C#/VB code |
| XmlModelChange | editing in config |

In some approaches, every time when the above events happen, the whole tree view is recalculated. All the calculating is done in a new thread, so the UI won't be blocked. One approach saves the CodeModel information to a cached code element structure, and when CodeModelChanged happens, updates that structure accordingly.

One architectural approach uses Class, Interface, Function, and Attribute categories. Class inherits from Class. Interface inherits from Class and from Interface. Class, Interface, and Function each have Attribute. Class and Interface each have Function. Assume that in this architecture, one would construct a bi-directional mapping for the code elements. When adding or deleting an Attribute, notification would go to all its parents (in Class, Interface and Function). When adding or deleting a Function, notification would go to all its parents (in Class and Interface) and its children (in Attribute). When adding or deleting an Interface, notification would go to all the Classes and Interfaces who inherit from it, all the Interfaces from whom it inherits, and all its children (in Function, Attribute). When adding or deleting a Class, notification would go to all the Classes who inherit from it, all the Classes and Interfaces from whom it inherits and all its children (in Function, Attribute). However, other approaches may also be considered.

WF Service Manager

For WF Service, some approaches also calculate two service trees. One is from the WF xamlx or xaml file (WF constructed by C#/VB code are not necessarily supported), the other is from the config file. Reading a service tree from config file and merging the two service trees can be done as described above for the Core Service Manager, and thus can share the same code. The following discussion addresses how to analyze workflow service from a workflow file 124.

A Workflow Runtime will provide an API to get the contract description of a service workflow instance: WorkflowSerivce.GetContractDescription( ). In addition, to implement an E2E scenario, location information and/or mapping of a typical operation to receive activity are called for, to aid analysis of the workflow. An approach to finding a service and its operation is to treat one receive activity as an operation, find all Receive activities in the workflow, and group all receive activities with the same contract name. Listed below are the steps to do this analysis:

1. WorkflowDesigner.Load
2. Get ModelTreeManager from WorkflowDesigner.
3. ModelTreeManager.Find( ) Find all model item whose underlying type is Receive activity or inherits from Receive Activity.
4. For each Activity, from ObjectToSourceLocation mapping gets and cache its source location.
5. For each ModelItem, read its OperationName and Contract property, group the operations with the same contract.
6. When user 104 clicks to select an operation, navigate to the receive activity with the specified Source Location, which is implemented by ModelSearchService.

One can also call WorkflowService.GetContract Description( ) to do a double check.

Service Explorer Communication with Workflow Designer

Service Explorer and Workflow designer are different Microsoft® Visual Studio® packages, running in different sandboxes (marks of Microsoft Corporation). Assume there is no direct way to access the designer instance from other packages. To allow communication one approach exposes an object for document opened by workflow designer to a Visual Studio® automation model. More specifically, Workflow Editor implements IVsExtensibleObject and returns the workflow designer instance in IVsExtensibleObject.GetGataObject( ). Alternately, one may return a Designer Proxy if returning the whole designer is too heavy to cross domain. By implementing the interface on the workflow side, then on the service exploration side, one can get the object returned in IVsExtensibleObject.GetGataObject( ) by DTE.Document.Window.Object, and use this instance to access the workflow designer instance in Workflow Visual Studio® Package. Thus, one can listen to the designer change, get the services from this already existed designer instance (still loading and getting the designer instance for unopened documents), and do navigation on the designer.

Moving to the topic of potential areas of impact, such as stress, some approaches create a new service analyzer every time that functionality is invoked, such that memory usage won't increase by multiple times of regeneration. As for localization, instructions can be placed in a dll assembly so that all the strings to be localized are put in the assembly resources. As for setup, it can be the same as Microsoft.VisualStudio.ServiceModel.dll setup.

Demo Example of a WF Service Explorer

As an example (a demo, to the extent one can demo code in a document), suppose one has a Workflow, and this workflow will expose SOAP standard services. To avoid confusion, the demo workflow is simple.

The workflow file looks like this in Xaml (a kind of xml) View:

```
<WorkflowService ConfigurationName="Service1" Name="Service1"
    xmlns:sco="clr-
namespace:System.Collections.ObjectModel;assembly=mscorlib"
    xmlns="http://schemas.microsoft.com/netfx/2009/xaml/servicemodel"
    xmlns:contract="http://tempuri.org/"
    xmlns:sad="clr-
namespace:System.Activities.Debugger;assembly=System.Activities"
    xmlns:p="http://schemas.microsoft.com/netfx/2009/xaml/activities"
    xmlns:x="http://schemas.microsoft.com/winfx/2006/xaml">
    <p:TextExpression.Namespaces>
        <sco:Collection x:TypeArguments="x:String" x:Name="___ReferenceID1">
            <x:String>System</x:String>
            <x:String>System.Collections.Generic</x:String>
            <x:String>System.Data</x:String>
            <x:String>System.Linq</x:String>
            <x:String>System.Text</x:String>
```

```
            </sco:Collection>
        </p:TextExpression.Namespaces>
        <p:TextExpression.References>
            <sco:Collection x:TypeArguments="p:AssemblyReference"
x:Name="___ReferenceID2">
                <p:AssemblyReference>mscorlib</p:AssemblyReference>
                <p:AssemblyReference>System</p:AssemblyReference>
                <p:AssemblyReference>System.Core</p:AssemblyReference>
                <p:AssemblyReference>System.Data</p:AssemblyReference>
                <p:AssemblyReference>System.ServiceModel</p:AssemblyReference>
                <p:AssemblyReference>System.Xml</p:AssemblyReference>
            </sco:Collection>
        </p:TextExpression.References>
    <p:Sequence DisplayName="Sequential Service"
sad:XamlDebuggerXmlReader.FileName="C:\Users\btslabs\Documents\Visual
Studio Dev11\Projects\WorkflowService2\WorkflowService2\Service1.xamlx"
              p:TextExpression.Namespaces="{x:Reference ___ReferenceID1}"
p:TextExpression.References="{x:Reference ___ReferenceID2}">
        <p:Sequence.Variables>
        <p:Variable x:TypeArguments="CorrelationHandle" Name="handle" />
        <p:Variable x:TypeArguments="x:Int32" Name="data" />
        </p:Sequence.Variables>
        <Receive x:Name="___ReferenceID0" DisplayName="ReceiveRequest"
OperationName="GetData" ServiceContractName="contract:IService"
CanCreateInstance="True">
            <Receive.CorrelationInitializers>
                <RequestReplyCorrelationInitializer CorrelationHandle="[handle]" />
            </Receive.CorrelationInitializers>
            <ReceiveMessageContent>
                <p:OutArgument x:TypeArguments="x:Int32">[data]</p:OutArgument>
            </ReceiveMessageContent>
        </Receive>
        <SendReply Request="{x:Reference Name=___ReferenceID0}"
DisplayName="SendResponse" >
            <SendMessageContent>
                <p:InArgument
x:TypeArguments="x:String">[data.ToString( )]</p:InArgument>
            </SendMessageContent>
        </SendReply>
    </p:Sequence>
        </WorkflowService>
```

In the foregoing XAML, parts which are related to services are shown in bold.

Assume the workflow has a designer view in a Visual Studio® environment or another IDE 138, so users can avoid editing a raw xaml file to compose a workflow. Some configuration information, such as the service address and how to communicate with the service, is put in the config file:

```
<?xml version="1.0" encoding="utf-8" ?>
    <configuration>
        <system.web>
            <compilation debug="true" strict="false" explicit="true"
targetFramework="4.5" >
                <assemblies>
                    <add assembly="System.Activities.Statements,
Version=4.0.0.0, Culture=neutral,
PublicKeyToken=31bf3856ad364e35">
                </assemblies>
            </compilation>
        </system.web>
        <system.serviceModel>
            <behaviors>
                <serviceBehaviors>
                    <behavior>
                        <!-- To avoid disclosing metadata information, set
the value below to false and remove the metadata endpoint above before
deployment -->
                        <serviceMetadata httpGetEnabled="true"/>
                        <!-- To receive exception details in faults for
debugging purposes, set the value below to true. Set to false before
deployment to avoid disclosing exception information -->
                        <serviceDebug includeExceptionDetailInFaults="false"/>
                    </behavior>
                </serviceBehaviors>
            </behaviors>
            <serviceHostingEnvironment aspNetCompatibilityEnabled="true"
                multipleSiteBindingsEnabled="true" />
        </system.serviceModel>
        <system.webServer>
            <modules runAllManagedModulesForAllRequests="true"/>
        </system.webServer>
    </configuration>
```

Now suppose a user 104 wants a general overview or conceptual view of the workflow. This is provided by the WF Service explorer. In this example, and using a graphics-neutral representation not limited to particular fonts, icons, window widgets and such, the WF service explorer will look like the following:

```
- WorkflowService6
    - Service1
        - endpoint
            <hostAddress>/
            basicHttpBinding
        - IService
            GetData
        - endpoint
            <hostAddress>/
            netMsmqBinding
        - IService
            GetData
```

The user 104 can click any element on the service explorer view, and it will lead to the corresponding part in the Workflow designer or the config file. For example, a click to select 332 GetData will open the workflow file and highlight the corresponding receive activity.

WCF Concept Summary

The following glossary may be helpful, with the understanding that the applicability of express or implied definitions in this glossary to a given embodiment is not automatic but depends rather on the understanding of one of ordinary skill in the art.

Contracts Terminology

Service Contract: A grouping of Operation Contracts exposed by a service. Generally defined by decorating a Common Language Runtime (CLR) interface or type with the ServiceContractAttribute.

Operation Contract: A definition of a service operation that specifies the message exchange pattern and the structure of the messages. Message can be defined implicitly using normal CLR method parameters or explicitly using a Message Contract.

Message Contract: An explicit message definition that specifies the headers and body for the message.

Data Contract: Defines for a CLR type what data should be exchanged (serialized in messages).

Message Exchange Pattern: Operation Contracts can specify either request-reply or one-way messaging.

Callback Contract: A ServiceContract to be implemented by the client in a duplex message exchange. Generally specified using the CallbackContract property on ServiceContractAttribute.

Action: A Uniform Resource Identifier (URI) that indicates the action to perform for a request message.

Reply Action: A Uri that indicates the action to perform for the reply message.

Protection Level: Operation Contracts and Service Contracts may specify that messages are to be signed or signed and encrypted.

Async Pattern: Indicates if an Operation Contract is implemented asynchronously.

Session Mode: Service Contracts may specify that the contract allows, does not allow or requires session support.

Is Initiating: Indicates that an operation can initiate a session.

Is Terminating: Indicates that an operation terminates a session.

Contract Behavior: Provides a local behavior scoped to a Service Contract.

Operation Behavior: Provides a local behavior scoped to an Operation Contract.

Implementation Terminology

Service Implementation Class: CLR class that implements the service functionality for one or more Service Contracts.

Concurrency Mode: Indicates whether an instance of a service can handle one thread (Single) or multiple threads that execute concurrently (Multiple), and if single-threaded, whether reentrancy is supported (Reentrant).

Instance Context Mode: Indicates whether the host creates a new service instance only once (Single), one per operation call (PerCall) or one per session (PerSession).

Configuration Terminology

Service Configuration: A service has an associated configuration that defines the local service behaviors (e.g., metadata publishing, enable debugging, throttles, and so on) and the set of configured endpoints for the service.

Service Endpoint: Exposes a Service Contract for a given service at a specific address using a specific binding to the wire.

Binding: Defines the transport, encoding and protocols to be used to exchange messages.

Session: Correlates a group of messages to a Service Endpoint into a conversation with associated state.

Standard Endpoint: A Service Endpoint that comes prepackaged to satisfy a specific scenario (e.g., a Discovery endpoint, an MEX endpoint, etc.).

System Endpoint: A Service Endpoint which exposes a contract that is not directly implemented by the service implementation type, but instead is provided by the system infrastructure (MEX and Discovery endpoints are also system endpoints).

Service Metadata: Various XML documents that describe the endpoints and contracts exposed by the service so a service client can be generated by tooling.

Discovery: Support for responding to find queries for services that match specified criteria.

Announcements: Notifications sent by a service to indicate service availability.

Service Throttles: Limits on the number of concurrent calls that a service can handle (MaxConcurrentCalls), number of instances that execute at one time (MaxConcurrentInstances), and sessions that the service can accept (MaxConcurrentSessions).

Credentials: Provide identity for a service or client.

Endpoint Behavior: Provides a local behavior scoped to an endpoint.

Service Behavior: Provides a local behavior scoped to a service.

Hosting Terminology

Service Host: Provides a runtime environment for a service. Some available development hosts include Internet Information Services (IIS), IIS Express, ASP.NET Development Server, WCF Service Host, and other custom hosts.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for transforming web application workflow information, the process comprising the steps of:
    obtaining a plurality of web application project files which belong to at least two different projects of an integrated development environment, the integrated development environment providing a set of coordinated software development tools which includes at least a textual editor, a compiler, and a debugger, the obtained web application project files including (i) at least one workflow implementation source file which has corresponding contract source code and (ii) at least one workflow configuration file which includes an address section that is syntactically delimited from a binding section of the workflow configuration file;
    extracting workflow service information from the web application project files, namely, extracting at least three of the following pieces of workflow service information: service class name, service contract name, service operation contract name, service endpoint address, service endpoint binding type, service implementation class name, the extracting step performing extraction of workflow service information from web application project files which match at least one of the following usage patterns: (a) a service contract resides in a first integrated development environment project, whereas service implementation, hosting, and configuration files reside in one or more other integrated development environment projects, or (b) a service contract resides in a first integrated development environment project, a service implementation file resides in a second integrated development environment project, and hosting and configuration files reside in a third integrated development environment project; and
    constructing a workflow service structure containing the at least three pieces of extracted workflow service information that were extracted from the at least two different projects of the integrated development environment.

2. The configured medium of claim 1, wherein the extracting step extracts workflow service information from web application project files which match usage pattern (b).

3. The configured medium of claim 1, wherein the constructing step constructs a workflow service structure including workflow service information for at least one of the following:
    a service contract for a service that is defined implicitly using Receive activities;
    a service contract for a web API service in which binding information is optional.

4. The configured medium of claim 1, wherein the constructing step comprises:
    calculating a code-based candidate service tree from a code model;
    calculating a config-based candidate service tree from a configuration file; and
    merging the code-based candidate service tree and the config-based candidate service tree.

5. The configured medium of claim 1, wherein the process further comprises displaying a visualization of the workflow service structure in a graphical user interface of the integrated development environment.

6. The configured medium of claim 5, wherein the displayed visualization shows a hierarchy in which at least one of the following conditions occurs:
    a service endpoint binding node is subordinate to a service class node;
    a service endpoint address node is subordinate to a service endpoint binding node;
    after a user selects a service contract node within a first area of the graphical user interface, operation contract node(s) associated with the selected service contract node are shown in a second area of the graphical user interface which is visually separated from the first area;
    a service contracts root node and a service endpoints root node are at the same level in the hierarchy.

7. The configured medium of claim 1, wherein the process further comprises receiving through a graphical user interface of the integrated development environment a navigational gesture which selects a node of the workflow service structure, and in response opening at least one web application project file which contains service information used in constructing the node in the workflow service structure.

8. A process for facilitating a developer's use of web application workflow information, the process comprising the steps of the developer:
    running a service explorer tool in an integrated development environment;
    viewing, in a graphical user interface of the service explorer tool, a visualization of a hierarchical workflow service structure containing workflow service information extracted from at least two different integrated development environment projects which match at least one of the following usage patterns: (a) a service contract resides in a first integrated development environment project, whereas service implementation, hosting, and configuration files reside in one or more other integrated development environment projects, or (b) a service contract resides in a first integrated development environment project, a service implementation file resides in a second integrated development environment project, and hosting and configuration files reside in a third integrated development environment project; and performing at least one of the following using at least one project file of a project of the integrated development environment:

making a change in a configuration file and then viewing an automatically updated visualization which reflects the change;

selecting a node of the visualization through the graphical user interface and then viewing an automatically opened web application project file which contains service information for the selected node;

selecting a node of the visualization through the graphical user interface and then viewing a web application project tool which has automatically received service information for the selected node;

selecting a node of the visualization through the graphical user interface and then editing configuration settings through a service configuration editor which is run for the selected node.

9. The process of claim 8, wherein the web application project tool viewed by the developer includes at least one of the following: a tracing tool, a configuration tool, a client testing tool, a unit testing tool, a hosting option tool, a publishing tool.

10. The process of claim 8, wherein the visualization has nodes representing at least one of the following service types: a WCF Core Service, a WCF Workflow Service, a WCF Web API Service, a WCF RIA Service, a WCF Data Service, a WCF Workflow Component Service.

11. The process of claim 8, wherein the developer performs at least one of the following:

selecting a node of the visualization through a view-contract item of the graphical user interface and then viewing an automatically opened web application project file which contains contract class source code service information for the selected node;

selecting a node of the visualization through a view-implementation item of the graphical user interface and then viewing an automatically opened web application project file which contains implementation class source code service information for the selected node;

selecting a node of the visualization through a view-configuration item of the graphical user interface and then viewing an automatically opened web application project file which contains configuration service information for the selected node.

12. The process of claim 8, wherein the developer selects a node at least in part by searching for at least one of the following pieces of service information: a service name, a service contract name, an operation name.

13. The process of claim 8, wherein the viewing step comprises viewing a visualization of a workflow service structure for which at least one of the following occurs:

an endpoint node representing an endpoint is selected, the endpoint was set implicitly, and the developer views automatically displayed service information which clarifies a derivation of the endpoint;

an address node representing an address is selected, an endpoint associated with the address was set implicitly, and the developer views automatically displayed service information which clarifies a derivation of the address;

a binding node representing a binding is selected, an endpoint associated with the binding was set implicitly, and the developer views automatically displayed service information which clarifies a derivation of the binding.

14. The process of claim 8, wherein the viewing step comprises viewing a visualization of a workflow service structure in which at least two of the following are expanded by default:

a project node;

a service node;

an endpoint node that has at least one of the following subordinate nodes: address, binding, service contract.

15. A computer system comprising:

a logical processor;

a memory in operable communication with the logical processor;

a hierarchical workflow service structure residing in the memory and having at least of each of the following nodes: a service node, an endpoint node, an endpoint address node, an endpoint binding node, an endpoint service contract node, the hierarchical workflow service structure containing workflow service information extracted from at least two different integrated development environment projects which match at least one of the following usage patterns: (a) a service contract resides in a first integrated development environment project, whereas service implementation, hosting, and configuration files reside in one or more other integrated development environment projects, or (b) a service contract resides in a first integrated development environment project, a service implementation file resides in a second integrated development environment project, and hosting and configuration files reside in a third integrated development environment project; and a service explorer software development tool of an integrated development environment, the service explorer including instructions which upon execution by a processor will result in a display at least one of the following to a user:

an automatically updated visualization of the hierarchical workflow service structure reflecting a change to a configuration file that is associated with a node of the structure;

an automatically opened file which contains textual information for a user-selected node of the hierarchical workflow service structure;

a software development tool of the integrated development environment, other than the service explorer, which has automatically received information for a user-selected node of the hierarchical workflow service structure.

16. The system of claim 15, wherein the service explorer further comprises instructions which upon execution will extract workflow service information from web application project files and construct the hierarchical workflow service structure based at least in part on the extracted workflow service information.

17. The system of claim 15, further comprising a display configured by a visualization of the hierarchical workflow service structure in which at least one of the following conditions occurs:

an operation contract node associated with a selected service contract node is shown in an area of the graphical user interface which is visually separated by a line from the selected service contract node;

a service contracts root node and a service endpoints root node are at the same level in the hierarchy;

a service contract node which has at least one subordinate operation contract node is unexpanded by default.

18. The system of claim 15, wherein the service explorer further comprises instructions which upon execution will perform at least two of the following:
- accept a visualization node selection through a view-contract item of the graphical user interface and then automatically display a file which contains contract class source code service information for the selected node;
- accept a visualization node selection through a view-implementation item of the graphical user interface and then automatically display a file which contains implementation class source code service information for the selected node;
- accept a visualization node selection through a view-configuration item of the graphical user interface and then automatically display a file which contains configuration service information for the selected node.

19. The system of claim 15, wherein the memory is further configured by containing at least one of the following software development tools which can be run by a user directly from within the service explorer: a tracing tool, a configuration tool, a client testing tool, a unit testing tool, a hosting option tool, a publishing tool.

20. The system of claim 15, wherein the service explorer further comprises instructions which upon execution will perform at least four of the following:
- accept selection of an endpoint node which represents an implicitly set endpoint, and then automatically display service information which clarifies a derivation of the endpoint;
- accept selection of an endpoint node which represents an explicitly set endpoint, and then automatically display an endpoint section of a configuration file for the endpoint;
- accept selection of an address node which represents an address that has an associated implicitly set endpoint, and then automatically display service information which clarifies a derivation of the address;
- accept selection of an address node which represents an address that has an associated explicitly set endpoint, and then automatically display an address section of a configuration file for the endpoint;
- accept selection of a binding node which represents a binding that has an associated implicitly set endpoint, and then automatically display service information which clarifies a derivation of the binding;
- accept selection of a binding node which represents a binding that has an associated explicitly set endpoint, and then automatically display a binding section of a configuration file for the endpoint.

* * * * *